United States Patent [19]

Yun

[11] Patent Number: 5,377,050

[45] Date of Patent: Dec. 27, 1994

[54] DIGITAL IMAGE SIGNAL RECORDING-REPRODUCING APPARATUS AND METHOD THEREOF

[75] Inventor: Jong-Kyoung Yun, Suwon, Rep. of Korea

[73] Assignee: Samsung Electronics Co., Ltd., Kyungki, Rep. of Korea

[21] Appl. No.: 73,674

[22] Filed: Jun. 8, 1993

[30] Foreign Application Priority Data

Jun. 8, 1992 [KR] Rep. of Korea .................. 92-9911

[51] Int. Cl.$^5$ .................. G11B 5/00; H04N 5/78; H04N 5/95
[52] U.S. Cl. .................. 360/32; 360/10.1; 360/8; 358/338
[58] Field of Search .................. 360/8, 9.1, 10.1, 10.3, 360/38.1, 77.04, 32; 358/133, 310, 312, 321, 335, 338

[56] References Cited

U.S. PATENT DOCUMENTS 4,800,447 1/1989 Toba .................. 358/338
5,065,259 11/1991 Kubota et al. .................. 360/32

*Primary Examiner*—Donald Hajec
*Assistant Examiner*—T. N. Forbus, Jr.
*Attorney, Agent, or Firm*—Sughrue, Mion, Zinn, Macpeak & Seas

[57] ABSTRACT

The present invention relates to a digital image signal recording/reproducing apparatus and the method thereof which can maintain a track spacing whereto a digital image signal is recorded during a long time mode in the same way as in the normal mode when the digital image signal is recorded on the recording medium, so that the crosstalks between channels caused by narrowed channel spacing of a tape can be prevented to thereby obtain an effect of a clear picture without a picture quality degradation.

14 Claims, 4 Drawing Sheets

DIGITAL IMAGE SIGNAL RECORDING-REPRODUCING APPARATUS AND METHOD THEREOF

BACKGROUND OF THE INVENTION

1. Field of the Invention

The present invention relates to a digital image signal recording/reproducing apparatus and a method thereof which, even in a long time mode such as a Long Play(LP) and Super Long Play(SLP), can maintain the same channel spacing of a tape as in a normal mode, so as to prevent crosstalk generated among the channels(tracks) when the channel spacing of the tape is narrowed in a long time mode.

2. Description of the Prior Art

Currently, a Video Cassette Recorder (VCR) is widely used as an image signal recording/reproducing apparatus.

Generally, the VCR records on a recording medium a signal inputted from a signal input source, such as a television or a video camera, and reproduce the signal recorded on the recording medium.

However, a broadcasting signal can also be directly received and recorded by equipping the VCR with a tuner.

Furthermore, because the length of the tape used as a recording medium in an image signal recording/reproducing apparatus such as the VCR is limited, a function for recording more information for a long period of time is necessary.

As a method to record the image signal on a limited recording medium for a long time in an analog method, the LP mode and SLP mode have been developed, which reduce a tape speed more than the standard play SP mode by 1/N, so that a recordable time can be increased by N times.

For example, the tape speed is reduced by $\frac{1}{2}$ in the LP mode, doubling the recordable time compared to the SP mode.

The tape speed is reduced by $\frac{1}{3}$ in the SLP mode, tripling the recordable time compared to the SP mode.

The standardized tape speed (SP) of the VHS VCR is 33.34 mm/s in the National Television System Committee NTSC color television system, and the speed is 23.39 mm/s in the Phase Alternation Line PAL system and the Sequential Couleur a Memoire SECAM system.

FIG. 1 is a constitutional diagram of a tape track in the SP mode of an image signal recording/reproducing apparatus.

In FIG. 1A, if the tape speed is assumed as V1, a track number per field as Tf, and a field number per second (generally 60 seconds) as Ts, a track interval A1 can be defined as in Formula (1).

$$A1 = \frac{V1}{Ts \times Tf} \quad \text{Formula (1)}$$

Therefore, a track width T1 can be obtained by the following formula (2).

$$T1 = A1 \cdot \sin\theta = V1 \cdot \sin\theta/(Ts \times Tf) \quad \text{Formula (2)}$$

In other words, it should be apparent that the track width T1 is in proportion to the speed V1 but is in an inverse proportion to the field number Ts.

Accordingly, in the conventional analog VCR, because the tape speed in the LP mode is reduced by $\frac{1}{2}$ (V2=V$\frac{1}{2}$) compared to tape speed of the SP mode as illustrated in FIG. 1B, the track width T2 of the LP mode is also reduced in width by $\frac{1}{2}$(T2=T$\frac{1}{2}$) compared to the track width T1 of SP mode.

Therefore, long time recording is possible in the LP mode due to the narrowed track width of T2: however, due to increased crosstalks among the tracks, a problem arises in that the signal-to-noise S/N ratio deteriorates.

Furthermore, there is another problem in that separate heads for SP mode are required and for LP mode according to differences in the track widths.

FIG. 1C is an illustration showing a recording track pattern to be formed on a tape of a digital image signal recording/reproducing apparatus. In a conventional digital image signal recording/reproducing apparatus, an incoming image signal data of 1 field is divided into more than 2 tracks to thereafter be recorded. Accordingly, one frame of image signal data is divided into 4 tracks to be recorded. However, in some cases, the data is divided into 6 tracks to be recorded.

FIG. 2 is a constructional block diagram of a conventional digital image signal recording/reproducing apparatus. A data compressing unit 1 compresses an incoming image signal data.

In other words, a Discrete Cosine Transform (DCT) is performed on the image signal data, a DCT coefficient is quantized and then the data is again compressed utilizing a Huffman coding technique.

An error correction encoding unit 2 performs an error correction encoding on the image signal data compressed at the data compressing unit 1.

In the error correction encoding unit 2, the data compressed in the data compressing unit 1 is added with a vertical added value for every external code in row directions at the external error correction encoding unit(not shown). The image data added with the vertical added information to the external code is shuffled for every picture unit at a shuffling unit(not shown) and a horizontal added information is added for every internal code in column directions at an internal error correction coding unit (not shown).

A modulating unit 3 modulates an output of the error correction encoding unit 2. In the modulating unit 3, an image data encoded by the error correction and expressed in an 8-bit is modulated into an M bit in order to compensate for a high error rate against a low frequency signal of an encoded block.

A recording amplifier 4 amplifies an output of the demodulating unit 3 in order that the output can be recorded on the recording medium. A head drum 5 having a head records on the recording medium the signal amplified by the head at the recording amplifier 4. A reproducing amplifier 6 amplifies a signal reproduced from the head on the drum 5.

A demodulating unit 7 decodes an output of the reproducing amplifier 6. In other words, the data modulated to the M-bit is decoded into an original 8-bit data at the demodulating unit 7.

An error correction decoding unit 8 performs error correction demodulating on the output of the decoding unit 7. In an internal error correction decoding unit(not shown), a correction is performed on a correctable error if an error occurs in the decoded data.

Uncorrectable errors are transmitted with an error flag, and a deshuffled data is arranged in an original order at a deshuffling unit(not shown).

A data transmitted along with the error flag is corrected at an external error correction decoding unit(not shown).

A data restoring unit 9 restores a data outputted and compressed from the error correction decoding unit 8 to an original data. Currently, there is no long time mode in the digital image signal recording/reproducing apparatus described above.

That is, if the tape speed is reduced by 1/N in the above digital image signal recording/reproducing apparatus in order to record for a long time, the track width becomes narrow to thereby increase the crosstalks among tracks, so that the S/N ratio deteriorates.

SUMMARY OF THE INVENTION

It is therefore an object of the present invention to provide a digital image signal recording/reproducing apparatus which compresses an image information in a long time mode by 1/N times more than in a standard mode and which reduces by 1/N the travelling speed of the tape and the rotating speed of the head drum to thereby record/reproduce the same on a recording medium, so that crosstalks among tracks(channels) generated as a track width is getting narrower during the long time mode can be prevented by maintaining the track width of the tape on par with the standard mode.

One embodiment of the present invention provides a digital image signal recording/reproducing method which achieves an object of the present invention, comprising the steps of: recording a digital image data on a recording medium by compressing a digital image data by 1/N times more than in a normal mode in order to cope with a recording speed reduced by 1/N in a long time mode for N times longer in time recording/reproducing; and reproducing the data recorded in the recording step faster by 1/N than in a normal reproduced speed to thereafter restore the compressed data.

Another embodiment of the present invention provides a digital image signal recording/reproducing apparatus comprising: a plurality of data compressing means for compressing a digital image signal with a different compression rate in accordance with a long time mode for N times of long time recording/reproducing; a recording signal processing means for selecting a data outputted from one of the data compressing means having different compression rates to thereby process the data as a signal recordable on the recording medium;

a head for recording the signal processed from the recording signal processing means on the recording medium to thereafter reproduce the recorded signal; a head control means for controlling a speed of the head; a reproduced signal processing means for processing and thereafter outputting the signal reproduced from the recording medium by the head; and a plurality of data restoring means for restoring from one of the data restoring means a signal outputted from the reproducing signal processing means to a digital image signal.

BRIEF DESCRIPTION OF THE DRAWINGS

A more complete understanding of the nature and objects of the invention, reference should be made to the following detailed description taken in conjunction with the accompanying drawings in which.

DETAILED DESCRIPTION OF THE INVENTION

Hereinafter, a preferred embodiment of a digital image signal recording/reproducing apparatus and a method thereof in accordance with the present invention will be described with reference to the accompanying drawings.

Figure 1A:
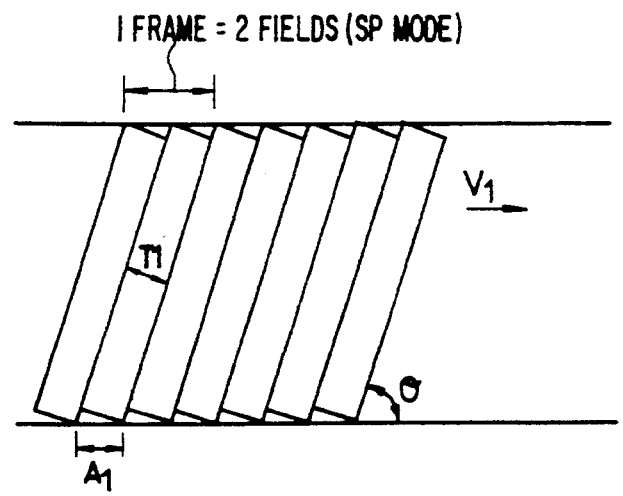
FIG. 1(A), 1(B) and 1(C) are constitutional drawings of a tape for a digital image signal recording/reproducing apparatus.
Figure 1B:
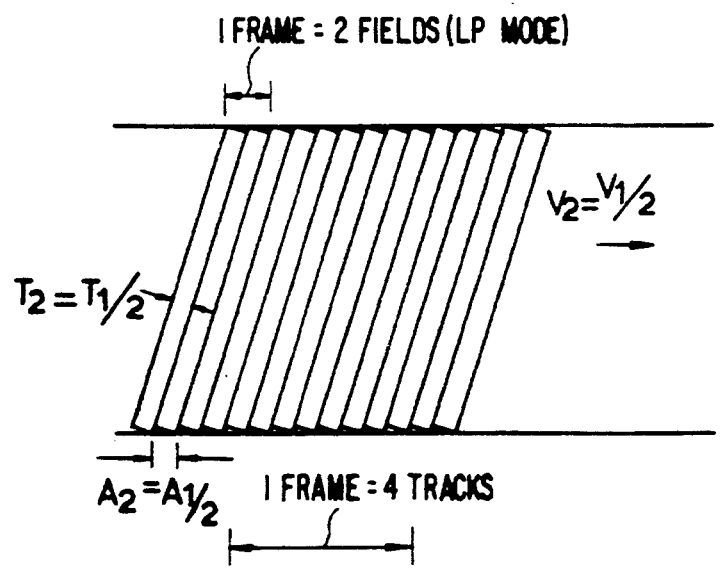
Figure 1C:
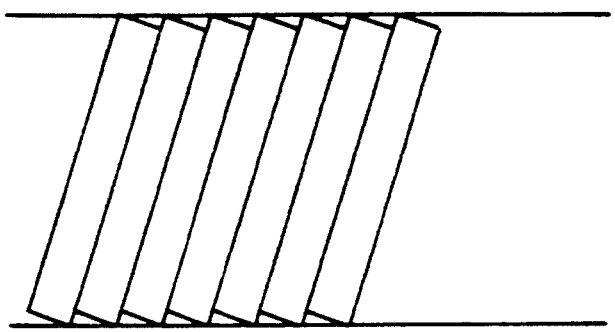
Figure 2:
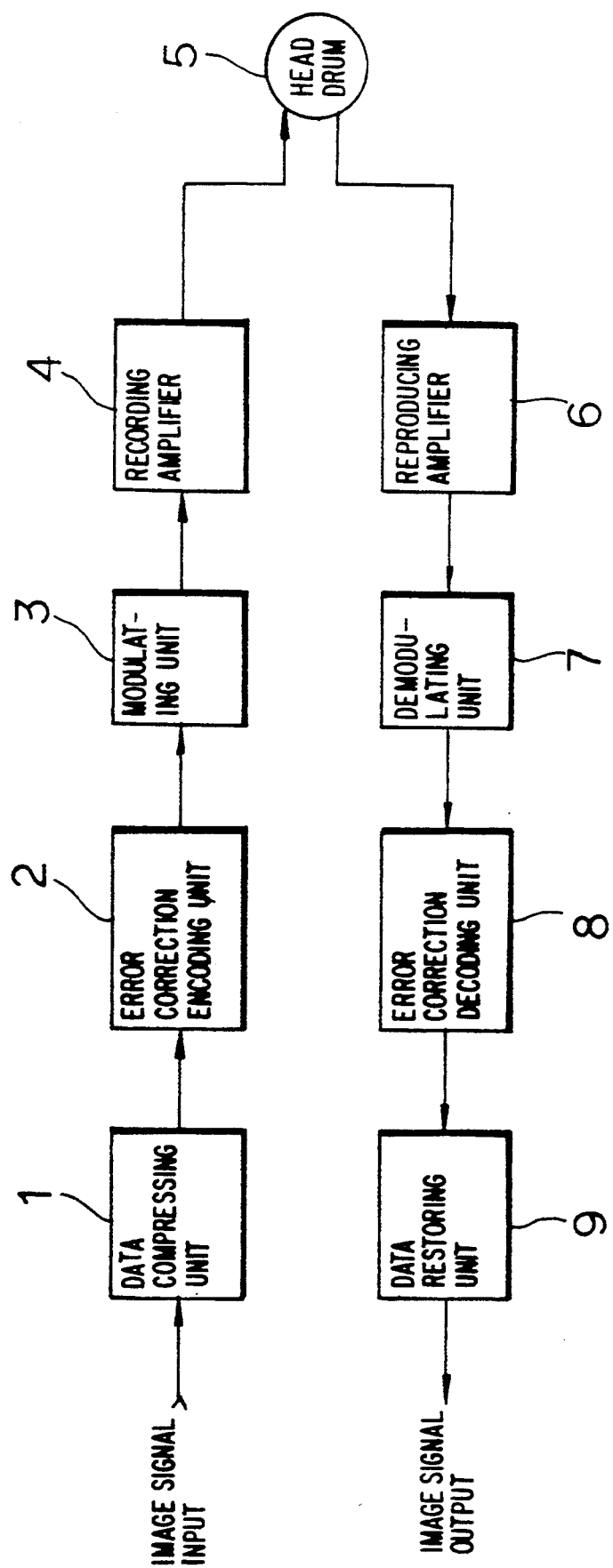
FIG. 2 is a block diagram of a conventional digital image signal recording/reproducing apparatus.
Figure 3:
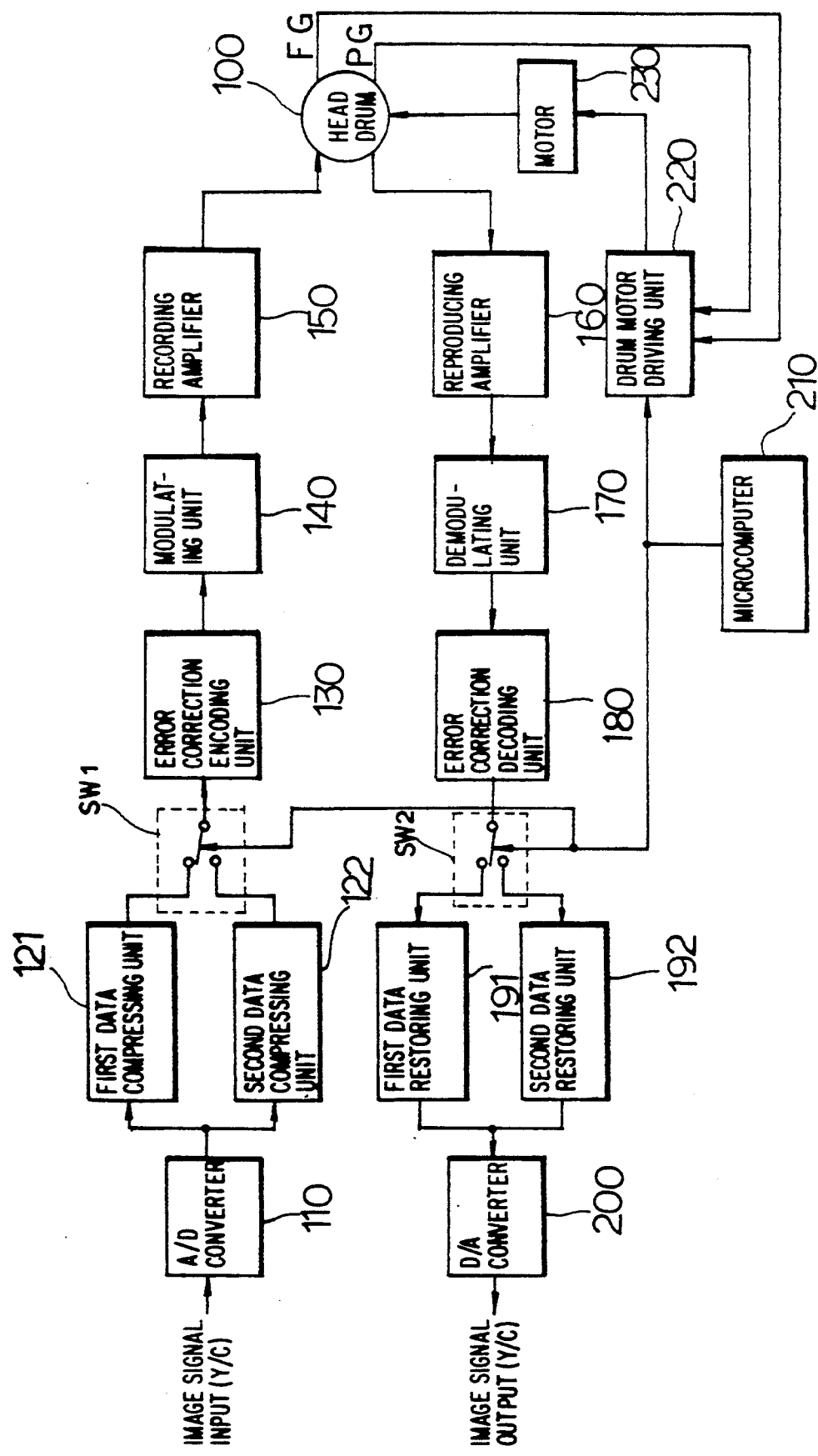
FIG. 3 is a block diagram of a digital image signal recording/reproducing apparatus in accordance with the present invention.

According to FIG. 3, the data compressing means comprises an Analog-to-Digital(A/D) converter 110 for converting an incoming image signal to a digital signal; and first and second data compressing units 121 and 122 for compressing outputs from the A/D converter 110 with respectively different compression rates.

The recording signal processing means comprises: a first control switch SW1 for selecting one of the outputs from the first and second data compressing units 121 and 122; an error correction encoding unit 130 for performing an error correction encoding on the output selected from the first control switch SW 1; a modulating unit 140 for modulating the output of the error correction encoding unit 130; and a record amplifying unit 150 for amplifying the output of the modulating unit 140 so that the output can be recorded on the recording medium.

A head is installed on a head drum 100 and records the output of the record amplifying unit 150 on the recording medium and reproduces the recorded signal.

The head control means comprises: a motor 230 for driving the head drum; and a drum motor driving unit 220 for controlling the motor 230 in accordance with a mode control signal outputted from the microcomputer 210 to thereby vary a rotating speed of the head drum.

Here, it should be apparent that the drum motor driving unit 220 receives a Frequency Generator FG signal and a Phase generator PG signal outputted from the FG and PG mounted on an internal of the head drum 100.

The reproduced signal processing means comprises: a reproducing amplifier 160 for amplifying the signal reproduced from the head; a demodulating unit 170 for demodulating the output from the reproducing amplifier 160; an error correction decoding unit 180 for performing an error correction decoding on the output of the decoding unit 170; and a second control switch SW 2 for selecting the output of the error correction decoding unit 180 to thereby output the same to one of the output terminals corresponding the standard mode or the long time mode.

The data restoring means comprises: first and second data restoring units 191 and 192 for restoring the compressed data outputted from the reproduced signal processing means with different stretch rates in accordance with the standard mode(normal mode) or long time mode; and a Digital-to-Analog D/A converter 200 for converting the digital image signal outputted from the first and second data restoring units 191 and 192 to an analog signal.

Now, the operation of FIG. 3 is described in detail below.

In FIG. 3, the Analog-to-Digital A/D converter 110 converts into a digital signal the signal processed into a luminance signal and a chrominance signal from an image signal inputted from such signal sources as a broadcasting signal, television or video camera.

The first data compressing unit 121 is a compressing unit for the normal mode and performs a data compression with half the compression rate compared with that of the second data compressing unit 122.

In other words, after a Discrete Cosine Transform (DCT) coefficient is quantized by a DCT utilizing a DCT variable length coding method which is a standard compression encoding method, the DCT coefficient is compressed to a predetermined quantity of information amount per a plurality of DCT blocks utilizing Huffman coding method.

By way of example, if the information amount of the first data compressing unit 121 is 20 Mbps, then the data information amount of the second data compressing unit 122 becomes 10 Mbps.

At this moment, if the microcomputer 210 is under the normal mode, a mode control signal at a "high" level (or a low level) is outputted.

If the mode control signal outputted from the first control switch SW1 is in a "high" level(or "low" level), the switch SW1 selects the first data compressing unit 121.

If the microcomputer 210 is under the long time mode, the mode control signal is outputted at a "low" level (or "high" level).

In the first control switch SW1, when the mode control signal outputted from the microcomputer 210 is under a "low"(or "high") level, the second data compressing unit 122 is selected.

Here at the microcomputer 210, a high (or low) state of logic level signal under the standard mode SP or a low (or high) state of logic level signal under a long time LP mode is outputted in accordance with a key recognition by a key input means corresponding to the standard mode SP or the long time mode(by way of example, LP mode) established by a user.

The error correction encoding unit 130 performs the error correction encoding on the outputs of the first and second data compressing unit 121 and 122 selected by the first control switch SW1.

The modulating unit 140 modulates a signal encoded at the error correction encoding unit 130.

The recording amplifying unit amplifies the output of the modulating unit 140, so that the output can be recorded on the recording medium.

The head is mounted on a head drum 100 and records the signal amplified from the record amplifying unit 150 on the recording medium and reproduces the recorded signal.

The reproducing amplifier 160 amplifies the image signal reproduced from the recording medium through the head mounted on the head drum 100.

The demodulating unit 170 demodulates the signal amplified from the reproducing amplifier 160.

The error correction decoding unit 180 performs the error correction decoding on the signal demodulated from the demodulating unit 170.

The second control switch SW2 inputs the output of the error correction decoding unit 180 to the first data restoring unit 191 when the mode control signal outputted from the microcomputer 210 is in the SP mode.

When the mode control signal is in the LP mode the output of the error correction decoding unit 180 is inputted to the second data restoring unit 192.

The first and second data restoring units 191 and 192 perform the DCT decoding on the output of the error correction decoding unit 180 to thereby restore the same to the original signal.

Here, the stretch rate of the first data restoring unit 191 corresponds to a compression rate of the first data compressing unit 121 and has half the stretch rate of the second data restoring unit 192.

In other words, when the mode control signal is in the SP mode, the first data compressing unit 121 and the first data restoring unit 191 having twice the image information compared with that of the LP mode are selected, and when in the LP mode, the second data compressing unit 122 and second data restoring unit 192 are selected.

The D/A converter 200 converts the data restored from the first and second data restoring units 191 and 192 to an analog signal.

Meanwhile, the mode control signal outputted from the microcomputer 210 is inputted to the drum motor driving unit 220.

The drum motor driving unit 220 controls a speed of the motor 230 according to the mode control signal outputted from the microcomputer 210 and varies a rotating speed of the head drum 100.

In other words, the speed of the head drum 100 under the LP mode is reduced to half the speed under the SP mode.

Figure 4:
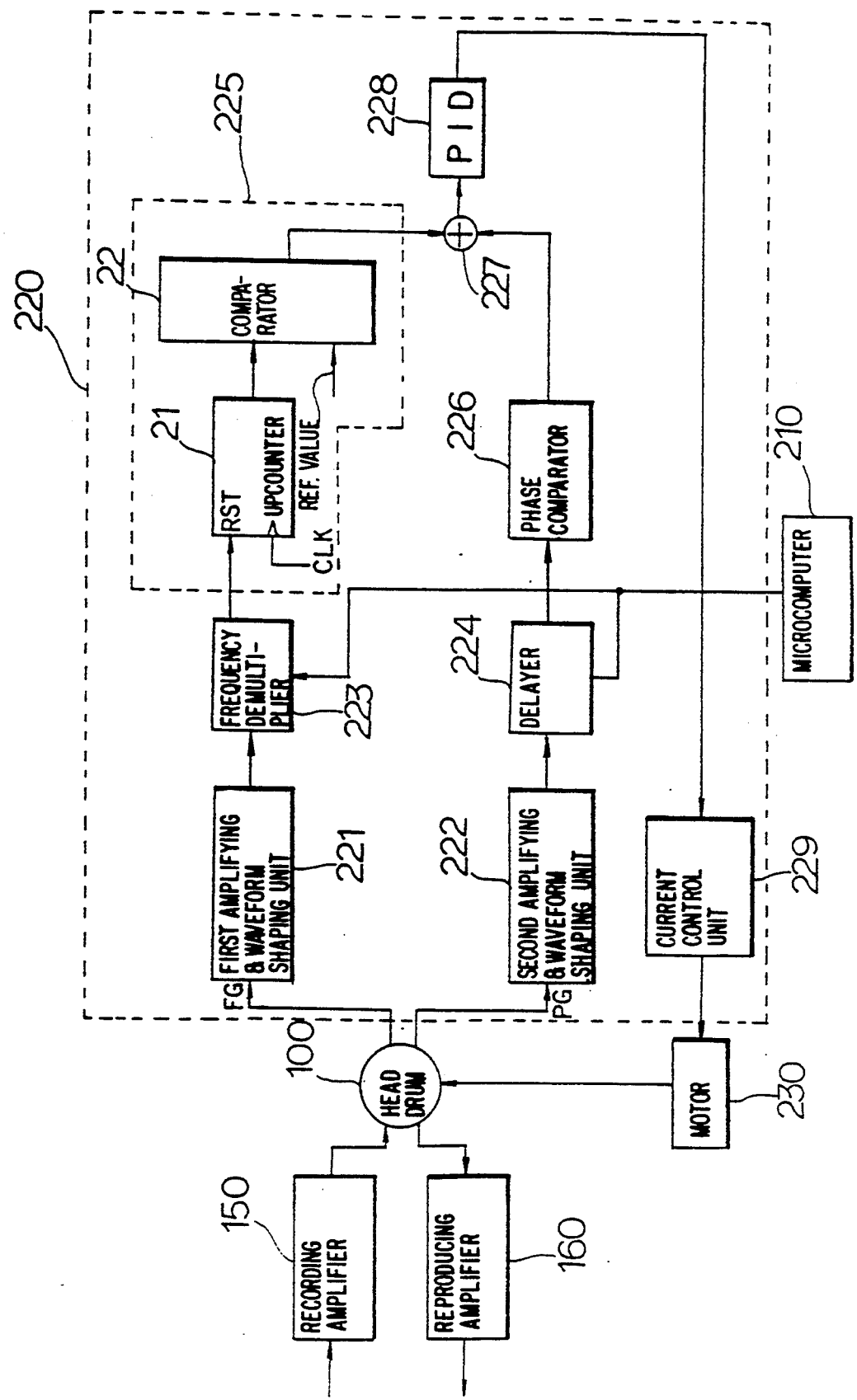
FIG. 4 is a detailed block diagram of a drum motor driving unit illustrated in FIG. 3.

FIG. 4 is a detailed block diagram of the drum motor driving unit 220 illustrated in FIG. 3.

The drum driving unit 220 under the LP mode reduces the speed of the head drum by one half compared with the speed under the SP mode, and the FG and PG signals outputted from the frequency generator and phase generator mounted within the drum are inputted.

The FG and PG signals outputted from the frequency generator and phase generator are amplified and waveform-shaped at first and second amplifying/waveform shaping units 221 and 222.

A frequency demultiplier 223 demultiplies a frequency of the FG signal outputted from the first amplifying/waveform shaping unit 221 in response to the mode control signal outputted from the microcomputer 210.

In other words, in LP mode, the frequency of FG signal outputted from the first amplifying/waveform shaping unit 221 is demultiplied by one half and outputted to a frequency discriminator 225.

The frequency discriminator 225 for upcounting a clock CLK comprises: an upcounter 21 for being reset by the signal outputted from the first amplifying-/waveform shaping unit 221; and a comparator 22 for comparing a counter value of the upcounter 21 with a reference value.

Accordingly, when an output of the first amplifying-/waveform shaping unit 221 is inputted to a reset terminal of the upcounter 21 in the frequency discriminator 225, the upcounter 21 is reset and performs upcounting until the next clock is received to thereafter output the same.

A comparator 22 compares the output of the upcounter 21 with a reference value (reference frequency).

The comparator 22, upon comparison, outputs a high (or low) level when a current drum rotary frequency is higher than the reference value, and when the current drum rotary frequency is lower than the reference value, the comparator 22 outputs a low(or high) level.

Meanwhile, in the present invention, a drum revolution is conventionally 3600 rpm in the case of SL mode, and a drum revolution in the case of LP mode is 1800 rpm which is half the revolution of SP mode.

A delayer 224 delays for a predetermined period of time an output of the second amplifying/waveform shaping unit 222 in response to the mode control signal outputted from the microcomputer 210.

In other words, in the case of LP mode, the PG signal outputted from the second amplifying/waveform shaping unit 142 is delayed two times more than in the SP mode.

A phase comparator 226 compares phases of the preset reference signal.

At this moment, the reference signal is based on a vertical synchronous signal of the image signal during the recording, and during the reproducing, it is based on an external synchronous signal or a signal generated from within.

An adder 227 adds an output of the frequency discriminator 225 to a phase difference of the phase comparator 226 to thereby output the same to a Proportion Integration Differentiation PID unit 228.

The PID unit 228 outputs a signal controlling a speed and phase of the drum motor 230 to a current control unit 229 in accordance with an output of the adder 227.

The current control unit 229 controls the rotary speed of the drum motor 230 in response to the output of the PID unit 228.

The table below compares the characteristics of the conventional LP mode and the LP mode of the present invention.

TABLE 1

| | conventional VCR | VCR of present invention | Remarks |
| --- | --- | --- | --- |
| Tape speed | ½ | ½ | Based on SP |
| Drum speed | 1 | ½ | Based on SP |
| Recorded information amount | 1 | ½ | Based on SP |
| Track width | ½ | 1 | Based on SP |
| Track number /field | 1 | ½ | Based on SP |
| Merit | A long time of recording/ reproducing is possible | 1. A long time recording and reproducing is possible. 2. A clear picture can be provided by 2 heads because of the same tape width. 3. A S/N ratio is reduced to 3dB in case of VHS because performances of the channels recorded on the tape are identical. | |

In other words, as shown in the table 1, in the conventional VCR, the tape travelling speed of the long time mode (LP mode) is reduced to one half compared to that of the standard mode(SP mode), so that recording/reproducing for a long time is possible.

However, a drawback is the crosstalks occurring between the channels due to the accompanying reduction of the track width by one half.

Of course, one field of image signal is recorded on one track and all the data can be recorded without any compression of data, so that the recorded information amount is the same.

The VCR according to the present invention reduces the tape travelling speed and also the rotary speed of the head drum by one half and at the same time, compresses the data by one half to thereby reduce the recorded information amount by one half, so as to permit a long time of recording and reproducing.

In contrast to the conventional VCR, because the track width between the long time mode and standard mode is identical, the crosstalks between the channels do not occur.

Of course, as illustrated in Table 1, the image signal of one field is recorded on a half track.

As seen from the foregoing, in the SP mode in accordance with the present invention, if one frame is allocated to 4 tracks, then one frame is allocated to 2 tracks in the LP mode, so that the data can be compressed by two times more than in the SP mode for recording and reproducing.

Meanwhile, although in the present invention, the tape speed has to be varied in the long time mode but the explanation has been omitted since it is the same as the conventional VCR.

As described in the foregoing, the digital image signal recording/reproducing apparatus and method thereof in accordance with the present invention maintain the track spacing in the same way as in the normal mode when the digital image signal is recorded on the recording medium, so as to prevent the crosstalks between channels to thereby obtain an effect of a clear picture without picture quality degradation.

The foregoing description and drawings are illustrative and are not to be taken as limiting. Still other variations and modifications are possible without departing from the spirit and scope of the present invention.

It should be also noted that although the embodiments of the present invention describe only the LP mode, modifications and variations are possible in all the long time modes, such as the SLP mode and the like.

What is claimed is:

1. A digital image signal recording and reproducing method comprising the steps of:
    recording a digital image data on a recording medium in a long time mode, in which recording speed is reduced by 1/N so as to record and reproduce for an N times longer period of time than in a normal time mode, by recording digital image data compressed to 1/N that of said digital image data in said normal time mode; and
    reproducing said digital image data recorded in said recording step 1/N times slower than in said normal time mode to thereafter restore said digital image data compressed in said recording step.

2. A digital image signal recording and reproducing method as defined in claim 1, wherein said recording speed is a rotary speed of a head drum.

3. A digital image signal recording and reproducing method as defined in claim 1, wherein said reproduced speed is a rotary speed of a head drum.

4. A digital image signal recording and reproducing apparatus comprising:
    a data compressing means for compressing digital image signal data in accordance with a long time mode, in which recording speed is reduced by 1/N so as to record and reproduce for an N times longer period of time than in a normal time mode, at a different compression rate than in said normal time mode;

recording signal processing means for selecting said digital image signal data outputted from said data compressing means having different compression rates to thereby process said digital image signal data as a signal recordable on a recording medium;

a head for recording said signal processed from said recording signal processing means on said recording medium to thereafter reproduce said signal recorded on said recording medium;

head control means for controlling a speed of said head;

reproduced signal processing means for processing and thereafter outputting said signal reproduced from said recording medium by said head; and a data restoring means for restoring a signal outputted from said reproduced signal processing means to a digital image signal.

5. A digital image signal recording and reproducing apparatus as defined in claim 4, wherein said data compressing means comprises:

an Analog-to-Digital converter for converting an incoming image signal to digital signal data and for outputting said digital signal data; and a plurality of data compressing units for compressing said digital signal data of said Analog-to-Digital converter with each of said plurality of data compressing units compressing said digital signal data at a different compression rate.

6. A digital image signal recording and reproducing apparatus as defined in claim 4, wherein said data compressing means comprises:

a plurality of data compressing units, each of said plurality of data compressing units compressing a digital image signal at different compression rates.

7. A digital image signal recording and reproducing apparatus as defined in claim 4, wherein said recording signal processing means comprises:

a first control switch for selecting one of the outputs from said compressing means;

an error correction encoding unit for performing an error correction encoding on said output selected from said first control switch;

a modulating unit for modulating said output of said error correction encoding unit; and a record amplifying unit for amplifying said output of said modulating unit so that said output can be recorded on a recording medium.

8. A digital image signal recording and reproducing apparatus as defined in claim 4, wherein said head control means comprises:

a head drum for holding said head;

a motor for driving said head drum; and a drum motor driving unit for controlling said motor in accordance with a mode control signal outputted from a microcomputer to thereby vary a rotating speed of said head drum.

9. A digital image signal recording and reproducing apparatus as defined in claim 8, wherein said drum motor driving unit is inputted with frequency generator signals and phase generator signals outputted from a frequency generator and a phase generator mounted within said head drum.

10. A digital image signal recording and reproducing apparatus as defined in claim 4, wherein said reproduced signal processing means comprises:

a reproducing amplifier for amplifying said signal reproduced from said head;

a demodulating unit for demodulating said output from said reproducing amplifier;

an error correction decoding unit for performing an error correction decoding on said output of said decoding unit; and a second control switch for selecting said output of said error correction decoding unit to thereby output the same to one of said output terminals in accordance with the standard mode or long time mode.

11. A digital image signal recording/reproducing apparatus as defined in claim 4, wherein said data restoring means comprises:

a plurality of data restoring units for restoring said compressed data outputted from said reproduced signal processing means to a digital image signal with different stretch rates in accordance with said normal mode or said long time mode; and a Digital-to-Analog converter for converting said digital image signal outputted from said data restoring units to an analog signal.

12. A digital image signal recording and reproducing apparatus as defined in claim 4, wherein said data restoring means comprises:

a plurality of data restoring units for restoring said compressed data outputted from said reproduced signal processing means to a digital image signal with different stretch rates in accordance with said normal mode or said long time mode.

13. A digital image signal recording and reproducing apparatus comprising:

a data compressing means for compressing digital image signal data in accordance with a long time mode, in which recording speed is reduced by 1/N so as to record and reproduce for an N times longer period of time than in a normal time mode, to 1/N of said digital image data in said normal time mode; and recording signal processing means for selecting said digital image signal data outputted from said data compressing means having different compression rates to thereby process said digital image signal data as a signal recordable on a recording medium;

a head for recording said signal processed from said recording signal processing means on said recording medium to thereafter reproduce said signal recorded on said recording medium;

head control means for controlling a speed of said head;

reproduced signal processing means for processing and thereafter outputting said signal reproduced from said recording medium by said head 1/N times slower than in said normal time mode; and a data restoring means for restoring a signal outputted from said reproduced signal processing means to a digital image signal.

14. A digital image signal recording and reproducing method comprising the steps of:

recording a digital image data on a recording medium in a long time mode, in which recording speed is reduced by 1/N so as to record and reproduce for an N times longer period of time than in a normal time mode, by recording a digital image data compressed at a different compression rate than in said normal time mode; and reproducing said digital image data recorded in said recording step to thereafter restore said digital image data compressed in said recording step.

* * * * *